United States Patent
Andresen et al.

(10) Patent No.: US 8,276,003 B2
(45) Date of Patent: Sep. 25, 2012

(54) REDUCING CURRENT DRAW OF A PLURALITY OF SOLID STATE DRIVES AT COMPUTER STARTUP

(75) Inventors: Mark E. Andresen, Raleigh, NC (US); Joaquin F. Pacheco, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/636,185

(22) Filed: Dec. 11, 2009

(65) Prior Publication Data
US 2011/0145618 A1 Jun. 16, 2011

(51) Int. Cl.
*G06F 1/26* (2006.01)
(52) U.S. Cl. ........ 713/300; 713/310; 713/320; 713/321; 713/322; 713/324; 713/330; 713/340
(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,778,418 A | 7/1998 | Auclair et al. | |
| 6,765,373 B1 | 7/2004 | Harvey et al. | |
| 7,003,623 B2 | 2/2006 | Teng | |
| 7,216,222 B2 | 5/2007 | Holzmann | |
| 7,254,724 B2 | 8/2007 | Payne | |
| 7,305,572 B1 | 12/2007 | Burroughs et al. | |
| 7,536,506 B2 | 5/2009 | Ashmore et al. | |
| 7,584,368 B2 | 9/2009 | Nichols et al. | |
| 2008/0201616 A1 | 8/2008 | Ashmore | |
| 2009/0274027 A1* | 11/2009 | Tanaka et al. | 369/47.55 |
| 2010/0332863 A1* | 12/2010 | Johnston | 713/300 |

* cited by examiner

*Primary Examiner* — M Elamin
(74) *Attorney, Agent, or Firm* — H. Barrett Spraggins; Thomas E. Tyson; Biggers & Ohanian, LLP.

(57) ABSTRACT

Reducing current draw of solid state drives from a shared power supply of a computer at computer startup, each SSD including computer memory, a capacitor, a disk controller, and a charge controller, the disk controller configured to enable the charge controller to charge the capacitor upon receiving a charge command, the SSDs organized into startup groups characterized by a position in a predefined startup order. Upon startup of the computer, beginning with a first startup group in the predefined startup order and until the last startup group in the predefined startup order has received a charge command, embodiments include, sending, by a storage device initiator, a charge command to a startup group to initiate charging of the capacitor of each solid state drive in the startup group and waiting a predefined period of time before sending another charge command to a next startup group in the predefined startup order.

18 Claims, 6 Drawing Sheets

REDUCING CURRENT DRAW OF A PLURALITY OF SOLID STATE DRIVES AT COMPUTER STARTUP

BACKGROUND OF THE INVENTION

1. Field of the Invention

The field of the invention is data processing, or, more specifically, methods, apparatus, and products for reducing current draw of a plurality of solid state drives at computer startup.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer technology that has experienced advancements is disk drive technology. Disk drive technology is moving away from hard disk drives with spinning platters and other moving parts, to solid state drives containing no moving parts. Such solid state drives typically include some form of non-volatile memory such as Flash memory. Some solid state drives also include a portion of volatile memory such as DRAM that is used to increase performance of access to data in the solid state drives. The volatile memory, however, without a consistent charge will lose the data stored in the memory. To safeguard data stored in the volatile memory at the occurrence of a sudden loss of power to the solid state drive, a capacitor is included in the solid state drive. The capacitor provides a temporary charge to the volatile memory even after withdrawal of operational power for the solid state drive. The capacitor draws a relatively large amount of power when initially charged, however, typically upon startup of the computer. Such current draw has largely been ignored to date, because solid state drives are typically implemented in small numbers in computer systems. As technology advances, however, arrays of a large number of solid state drives are being implemented in a single computer or server enclosure where all the solid state drives of the array share the same power supply. The cumulative current draw of the capacitors of such an array of a solid state drive is inefficient and may cause power supply failure as the number of solid state drives increases.

SUMMARY OF THE INVENTION

Methods, apparatus, and products for reducing current draw of a number of solid state drives from a shared power supply of a computer at computer startup are disclosed. Each solid state drive includes computer memory, a capacitor, a disk controller, and a charge controller. The disk controller is configured to enable the charge controller to charge the capacitor upon receiving a charge command. The solid state drives are organized into a plurality of startup groups characterized by a position in a predefined startup order. Reducing current draw includes beginning with a first startup group in the predefined startup order and until the last startup group in the predefined startup order has received a charge command, upon startup of the computer: sending, by a storage device initiator, a charge command to a startup group to initiate charging of the capacitor of each solid state drive in the startup group and waiting a predefined period of time before sending another charge command to a next startup group in the predefined startup order.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
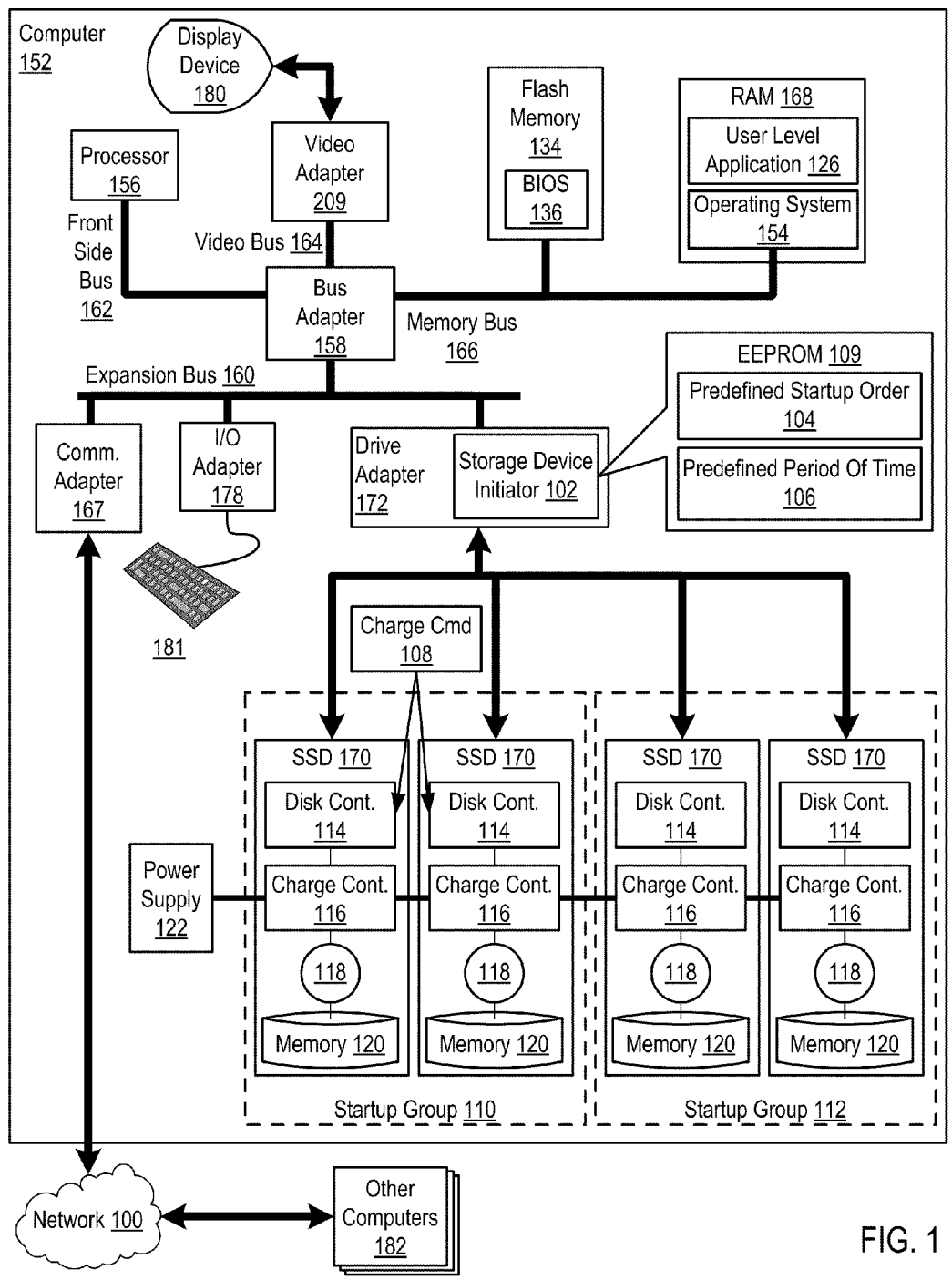
FIG. 1 sets forth a block diagram of automated computing machinery comprising an exemplary computer useful in reducing current draw of a plurality of solid state drives from a shared power supply at computer startup according to embodiments of the present invention.

Exemplary methods, apparatus, and products for reducing current draw of a plurality of solid state drives at computer startup in accordance with the present invention are described with reference to the accompanying drawings, beginning with FIG. 1. FIG. 1 sets forth a block diagram of automated computing machinery comprising an exemplary computer (152) useful in reducing current draw of a plurality of solid state drives (170) from a shared power supply (122) at computer startup according to embodiments of the present invention. A solid state drive ('SSD'), as the term is used in this specification, is a data storage device that uses solid-state memory to store persistent data, rather than using electromechanical devices.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a user level application (126), module of computer program instructions for carrying out user level data processing tasks. Examples of such user level applications include word processing applications, spreadsheet applications, multimedia playback applications, multimedia library applications, database management applications and so on as will occur to readers of skill in the art. Also stored in RAM (168) is an operating system (154). Operating systems useful in computers that reduce current draw of a plurality of solid state drives at computer startup according to embodiments of the present invention include UNIX™, Linux™, Microsoft XP™, AIX™, IBM's i5/OS™ and others as will occur to those of skill in the art. The operating system (154) and user level application (126) in the example of FIG. 1 are shown in RAM (168), but many components of such software typically are stored in non-volatile memory also, such as, for example, on a disk drive (170) or flash memory (134).

The computer (152) of FIG. 1 includes a disk drive adapter (172) coupled through an expansion bus (160) and the bus adapter (158) to the processor (156) and other components of the computer (152). The disk drive adapter (172) connects data storage to the computer (152) in the form of a number of a solid state drives (170). The SSDs (170) in the example of FIG. 1 receive power from a shared power supply (122). That is, each of the four SSDs (170) in the example of FIG. 1 share the computer's (152) power supply (122). The same power supply (122) may also power some or all of the other components of the computer (152). Disk drive adapters useful in computers for reducing current draw of a plurality of solid state drives at computer startup according to embodiments of the present invention include Integrated Drive Electronics ('IDE') adapters, Serial Advanced Technology Attachment ('SATA') adapters, Serial Attached Small Computer System Interface ('SAS') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example disk drive adapter (172) of FIG. 1 includes a storage device initiator (102), a module of automated computing machinery comprising an aggregation of computer program instructions and computer hardware. In the example of FIG. 1, the storage device initiator (102) is configured for reducing current draw of the SSDs from the shared power supply (122) of the computer (152) at computer startup in accordance with embodiments of the present invention.

In the example of FIG. 1, each solid state drive (170) includes computer memory (120), a capacitor (118), a disk controller (114), and a charge controller (116). The disk controller (114) is configured to enable the charge controller (116) to charge the capacitor (118) upon receiving a charge command (108). A disk controller (114) may also enable data communications between the disk and the drive adapter (172).

The computer memory (120) may comprise any non-moving, solid-state computer memory such as non-volatile flash memory, Dynamic RAM, Static RAM, and so on as will occur to readers of skill in the art. The computer memory (120) of an SSD may also include a portion of volatile memory.

The capacitor (118) in the SSDs (170) may be used for various tasks, including, for example, charging a volatile portion of the computer memory (120). Volatile portion of computer memory in SSDs may be used as a type of a cache, storing recently accessed or frequently accessed data. Without power, however, data store in such volatile computer memory of an SSD will eventually become unusable. The capacitor then may be used to provide a charge to such volatile portion of memory such that upon a sudden removal of operating power, the data stored in the volatile portion of memory may be copied to non-volatile memory.

A charge command (108) represents an instruction to initiate charging of the capacitor (118) of the SSD. The charge command (108) is described as a 'command' due to the effect of receipt by the disk controller of an SSD—the disk controller enables the charge controller to charge the capacitor (118). The charge command (108) may be in the form of a traditional command, a notification, but is not limited to the form of a traditional command. In fact, any change in electrical signals, effected by a storage device initiator and experienced by a disk controller, any data sent by a storage device initiator to a disk controller, or any notification sent by a storage device initiator to a disk controller may be a charge command as the term is used here. One example of a charge command is bus activity on the bus connecting the SSD and disk controller to the storage device initiator. A storage device initiator may send a charge command to a disk controller by generating bus activity. A disk controller is said to 'receive' a charge command implemented as bus activity by detecting the bus activity. Another example of a charge command is a physical layer (PHY) command.

The SSDs (170) in the example of FIG. 1 are organized into a number of startup groups (110, 112). A startup group as the term is used in this specification is a group of one or more SSDs that are to receive a charge command at the same, or nearly the same, time. Upon receiving a charge command (108), the disk controller (114) enables the charge controller (116) to charge the capacitor (118). The charge controller (116) is a module of automated computing machinery configured to control a capacitor's access to power from the shared power supply (122) at the behest of the disk controller (114). Having received a charge command at approximately the same time, SSDs in a particular startup group are said to 'start' or 'startup' at approximately the same time. The startup group (110) in the example of FIG. 1 includes two SSDs (170) having a disk controller that begins charging the capacitor (118) at approximately the same time—upon each SSDs disk controller (114) receiving a charge command (108). Likewise, the startup group (112) includes two SSDs (170) having a disk controller that begins charging the captor (118) at the same time—upon each SSDs disk controller (114) receiving a charge command (108).

Each startup group (110, 112) in the example of FIG. 1 is characterized by a position in a predefined startup order (104). A predefined startup order (104) is a data structure that includes information defining an order in which each startup group is to be sent a charge command. The order is defined by position. Each position may be associated with one startup group. The data structure forming the predefined startup order (104) may, for example, be implemented as one or more tables, lists, linked lists, and so on. In the example of FIG. 1, the predefined startup order (104) is stored in EEPROM (109) of the storage device initiator (102). Such EEPROM is used here for clarity of explanation only, not limitation. Any type of computer memory may be used to store the computer program instructions forming the storage device initiator (102) as will occur to readers of skill in the art.

The storage device initiator (102) of FIG. 1 reduces current draw of the SSDs (170) at computer startup by beginning with a first startup group in the predefined startup order (104) and until the last startup group in the predefined startup order (104) has received a charge command (108): sending a charge command (108) to a startup group (110, 112) to initiate charging of the capacitor (118) of each solid state drive (170) in the startup group (110, 112) and waiting a predefined period of time (106) before sending another charge command (108) to a next startup group in the predefined startup order (104). Consider, as an example, the two startup groups (110, 112) of FIG. 1. The storage device initiator (102) may reduce current draw of the SSDs from the shared power supply on computer startup by sending a charge command to the startup group (110), waiting a predefined period of time, and sending another charge command to the startup group (112). In this way, the storage device initiator (102) staggers the startup current draw of the capacitors (118) of the SSDs (170).

The storage device initiator (102) may begin the staggered startup process of the startup groups (110, 112) at the occurrence of various events. The Basic Input/Output Services ('BIOS') module (136) stored in flash memory (134) may, prior to bootloading the operating system (154), instruct storage device (102) to start the SSDs. Alternatively, the storage device initiator (102) may detect a predefined amount of electrical activity on the physical layer connecting the SSDs to the drive adapter (172) to initiate startup of the SSDs.

The storage device initiator (102) in the example of FIG. 1 is implemented as a module of the drive adapter (172) for clarity of explanation, not limitation. The storage device initiator (102) may be implemented as a separate module of auatomed computing machinery, as a module of BIOS, or in other ways as will occur to readers of skill in the art. Each such way is well within the scope of the present invention.

The example computer (152) of FIG. 1 also includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for reducing current draw of a plurality of solid state drives at computer startup according to embodiments of the present invention include modems for wired dial-up communications, Ethernet (IEEE 802.3) adapters for wired data communications network communications, and 802.11 adapters for wireless data communications network communications.

The arrangement of SSDs (170), startup groups (110, 112), storage device initiators (102), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
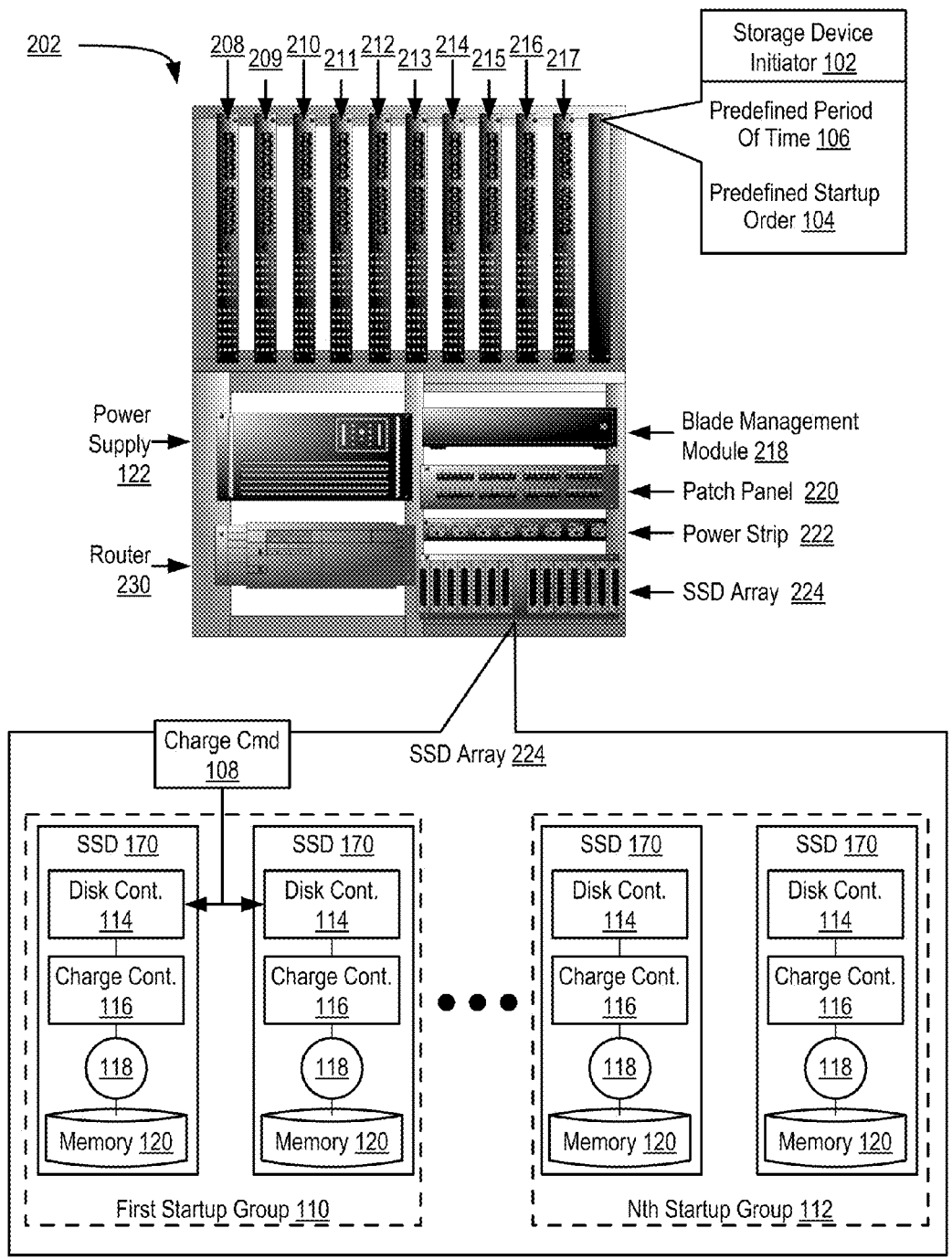
FIG. 2 sets forth a functional block diagram of an exemplary blade server chassis in which current draw of a plurality of solid state drives is reduced at computer startup in accordance with embodiments of the present invention.

For further explanation, FIG. 2 sets forth a functional block diagram of an exemplary blade server chassis (202) in which current draw of a plurality of solid state drives (170) is reduced at computer startup in accordance with embodiments of the present invention. The example blade server chassis (202) includes a number of blade servers (208-217). A blade server chassis is an enclosure in which blade servers as well as other electrical components are installed. The chassis provides cooling for servers, data communications networking connections, input/output device connections, power connections, and so on as will occur to those of skill in the art. One example blade server chassis is IBM's BladeCenter. An IBM BladeCenter E includes 14 blade slots, a shared media tray with an optical drive, floppy drive, and Universal Serial Bus ('USB') port, one or more management modules, two or more power supplies, two redundant high speed blowers, two slots for Gigabit Ethernet switches, and two slots for optional switch or pass-through modules such as Ethernet, Fibre Channel, InfiniBand or Myrient 2000 modules.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

In addition to the blade servers (208-217), the blade server chassis (202) in the example of FIG. 2 also house several other electrical components including a shared power supply (122), a data communications router (230), a patch panel (220), a power strip (222), a blade management module (218), and an SSD array (224).

A management module is an aggregation of computer hardware and software that is installed in a data center to provide support services for computing devices, such as blade servers. Support services provided by the management module (218) include monitoring health of computing devices and reporting health statistics to a system management server, power management and power control, save and restore configurations, discovery of available computing devices, event log management, memory management, and so on. An example of a management module that can be adapted for use in systems for securing blade servers according to embodiments of the present invention is IBM's Advanced Management Module ('AMM').

The management module (218) is connected for data communications to the blade servers and other computing devices through a local area network ('LAN'). Such a LAN may be implemented as an Ethernet network, an IP (Internet Protocol) network, or the like. The management module is also connected to the blade servers through an out-of-band communications link. Such an out-of-band communications link may be implemented as an Inter-Integrated Circuit ('I²C') bus, a System Management Bus ('SMBus'), an Intelligent Platform Management Bus ('IPMB'), an RS-485 bus, or the like.

The example blade server chassis (202) of FIG. 2 also includes a storage device initiator (102) configured to reduce current draw of the solid state drives (170) of the SSD array (224) from the shared power supply (122) at computer startup in accordance with embodiments of the present invention. Each SSD (170) in the SSD array includes computer memory (120), a capacitor (118), a disk controller (114), and a charge controller (116). The disk controller (114) is configured to enable the charge controller (116) to charge the capacitor (118) upon receiving a charge command (108). The SSDs (170) are also organized into startup groups (110, 112). In the example of FIG. 2 there may be "N" startup groups with startup group (110) being a first startup group and startup group (112) being an Nth startup group. In some embodiments the SSD array (224) may include up to 48 SSDs. In addition, startup groups may contain one, two, or any number of SSDs. Each startup group depicted in the example of FIG. 2 includes an equal number of SSDs for clarity only, not limitation. Startup groups in the same system may include varying numbers of SSDs: a first startup group including two SSDs, a second including three SSDs, a third including one SSD and so on. The startup groups (110, 112) are characterized by a position in a predefined startup order (104).

The storage device initiator (102) may reduce current draw of the SSDs (170 of the SSD array (224) from the shared power supply (122) at computer startup by, beginning with a first startup group in the predefined startup order (104) and until the last startup group in the predefined startup order (104) has received a charge command (108): sending a charge command (108) to a startup group (110, 112) to initiate charging of the capacitor (118) of each solid state drive (170) in the startup group (110, 112) and waiting a predefined period of time (106) before sending another charge command (108) to a next startup group in the predefined startup order (104).

The arrangement of servers, chassis, routers, power supplies, management modules, storage device initiators, SSDs, and other devices making up the exemplary system illustrated in FIG. 2 are for explanation, not for limitation. Data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
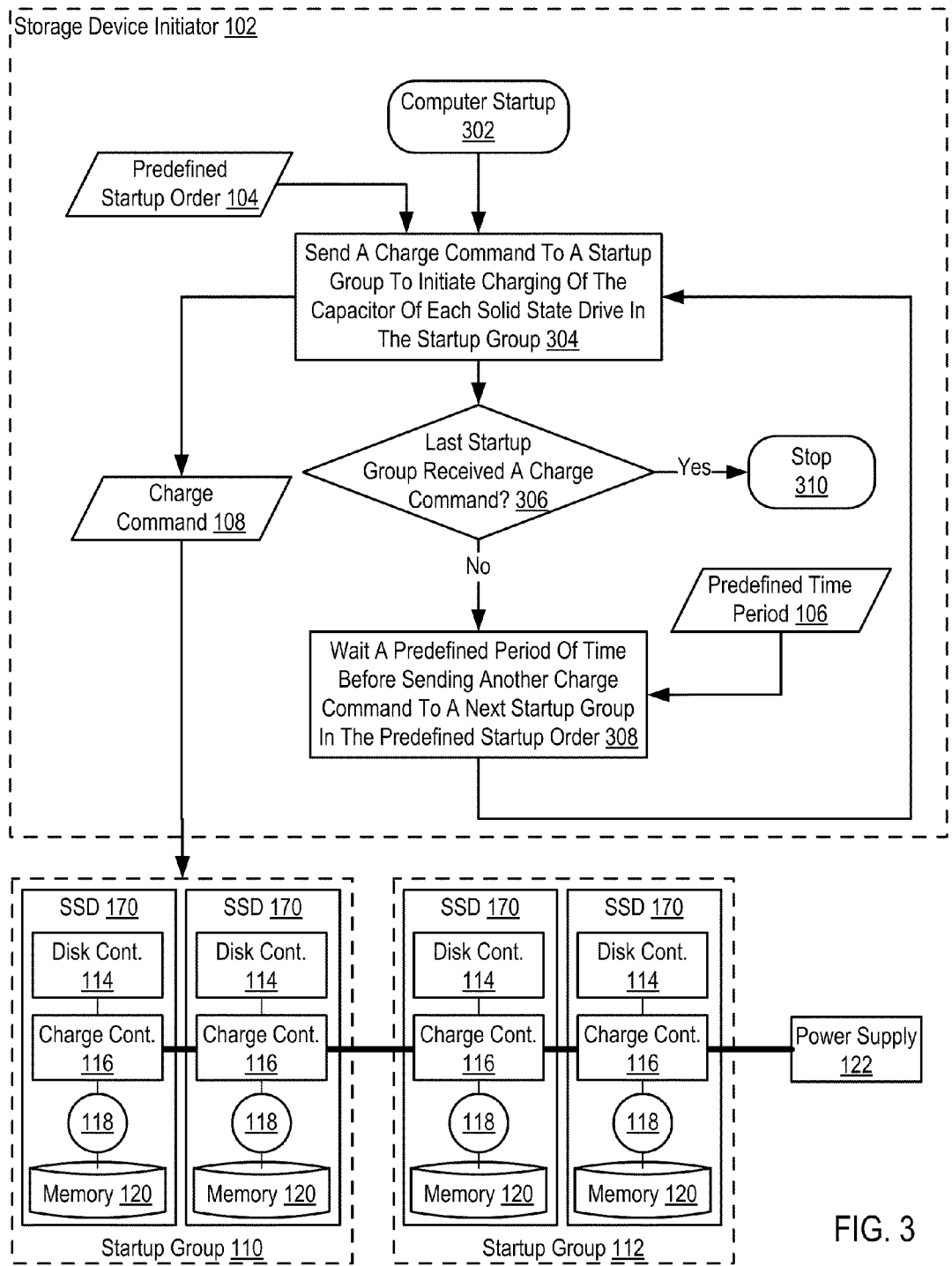
FIG. 3 sets forth a flow chart illustrating an exemplary method for reducing current draw of solid state drives at computer startup according to embodiments.

For further explanation, FIG. 3 sets forth a flow chart illustrating an exemplary method for reducing current draw of solid state drives at computer startup according to embodiments. In the method of FIG. 3, the SSDs receive power form a shared power supply (122). Each of the SSDs (170) includes computer memory (120), a capacitor (118), a disk controller (114), and a charge controller (116). The disk controller (114) in the example of FIG. 3 is configured to enable the charge controller (116) to charge the capacitor (118) upon receiving a charge command (108) from a storage device initiator (102). The SSDs (170) are organized into startup groups (110, 112). The startup groups (110, 112) in the example of FIG. 3 are characterized by a position in a predefined startup order (104).

The method of FIG. 3 includes sending (304), by a storage device initiator (102), a charge command (108) to a startup group (110, 112) to initiate charging of the capacitor (118) of each solid state drive (170) in the startup group (110, 112). Sending (304) a charge command (108) to a startup group (110, 112) may be carried out in various ways depending upon the type of bus and storage interface connecting the SSDs to other components of the computer. In some embodiments for example, a particular startup group includes one or more SSDs coupled for data communications to associated drive adapters and the storage device initiator via a Serial Advanced Technology Attachment ('SATA') bus and storage interface. In such an embodiment, sending (304) a charge command (108) to the particular startup group includes establishing physical layer ('PHY') communications with the drive adapters of the particular startup group. Such establishment of PHY communications may be carried out with a COMRESET command issued by the storage device initiator to the disk controller of an SSD. In other embodiments, a particular startup group includes one or more SSDs coupled for data communications to associated drive adapters and the storage device initiator over a Serial Attached Small Computer System Interface ('SAS') bus. In such embodiments sending (304) a charge command (108) to the particular startup group includes sending a NOTIFY (ENABLE SPINUP) and SCSI UNIT START/STOP primitive to the disk controllers of the particular startup group.

The method of FIG. 3 also includes determining (306) whether the last startup group in the predefined startup order (104) received a charge command (306). Determining (306) whether the last startup group in the predefined startup order (104) received a charge command (306) may be carried out by determining whether the last startup group to be sent (304) a charge command is the startup group in the final position of the predefined order.

If the last startup group has received a charge command (108), the method of FIG. 3 stops (310). That is, all startup groups have been started in a staggered, current draw reducing manner in accordance with embodiments of the present invention. If the last startup group has not received a charge command (108), the method of FIG. 3 continues by waiting (308) a predefined period of time (106) before sending another charge command (108) to a next startup group in the predefined startup order (104).

In this way, the steps of sending (304) a charge command and waiting a predefined period of time form an iterative processes that is carried out completely for each startup group in the predefined order except the last startup group. Once the last startup group is sent (304) a charge command, there is no need to wait (308) the predefined period of time (106). As such, the method of FIG. 3 may be said to begin, at computer startup (302) of the computer, with a first startup group in the predefined startup order (104) and continue until the last startup group in the predefined startup order (104) has received a charge command (108).

Figure 4:
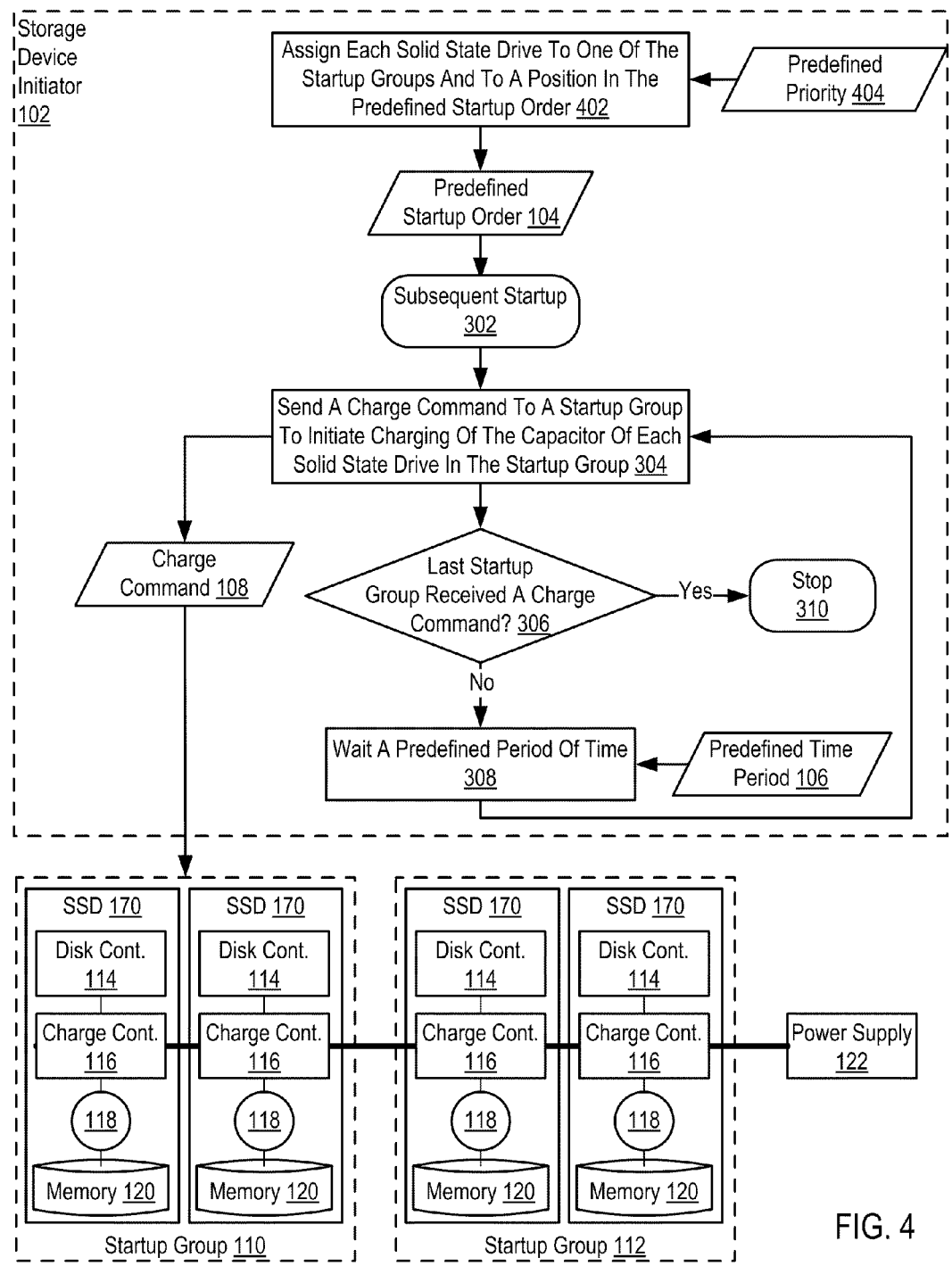
FIG. 4 sets forth a flow chart illustrating a further exemplary method for reducing current draw of a plurality of solid state drives at computer startup according to embodiments of the present invention.

For further explanation, FIG. 4 sets forth a flow chart illustrating a further exemplary method for reducing current draw of a plurality of solid state drives at computer startup according to embodiments of the present invention. The method of FIG. 4 is similar to the method of FIG. 3 in that in the method of FIG. 3 each SSD (170) includes computer memory (120), a capacitor (118), a disk controller (114), and a charge controller (116). The disk controller (114) is configured to enable the charge controller (116) to charge the capacitor (118) upon receiving a charge command (108). The SSDs (170) are organized into a plurality of startup groups (110, 112) that are characterized by a position in a predefined startup order (104). The method of FIG. 4 is also similar to the method of FIG. 3 in that the method of FIG. 4 includes beginning with a first startup group in the predefined startup order (104) and until the last startup group in the predefined startup order (104) has received a charge command (108), upon startup of the computer (152): sending (304), by a storage device initiator (102), a charge command (108) to a startup group (110, 112) to initiate charging of the capacitor (118) of each solid state drive (170) in the startup group (110, 112); and waiting (308) a predefined period of time (106) before sending another charge command (108) to a next startup group in the predefined startup order (104).

The method of FIG. 4 differs from the method of FIG. 3, however, in that the method of FIG. 4 includes assigning (402) each solid state drive (170) to one of the startup groups (110, 112) and to a position in the predefined startup order (104) in dependence upon a predefined priority (404) of the solid state drive (170). A predefined priority (404) may be defined by a system administrator or other user through a BIOS module, system configuration application, or other module of automated computing machinery configured to receive priority input from a user. The predefined priority may be used to define a particular startup order. For example, SSDs storing the computer's operating system may be set at the highest priority indicating an early startup of those SSDs, while SSDs storing non-essential applications and data—a media library for example—may be set with to a lower priority. The storage device initiator (102) may assign (402) each solid state drive (170) to a startup group and to a position in the predefined startup order by associating, in a data structure designated for such purpose, to each SSD a group identifier and a priority number. When sending (304) a charge command to the startup groups, the storage device initiator may use the information stored in the data structure to identify which SSDs to send the charge command.

Figure 5:
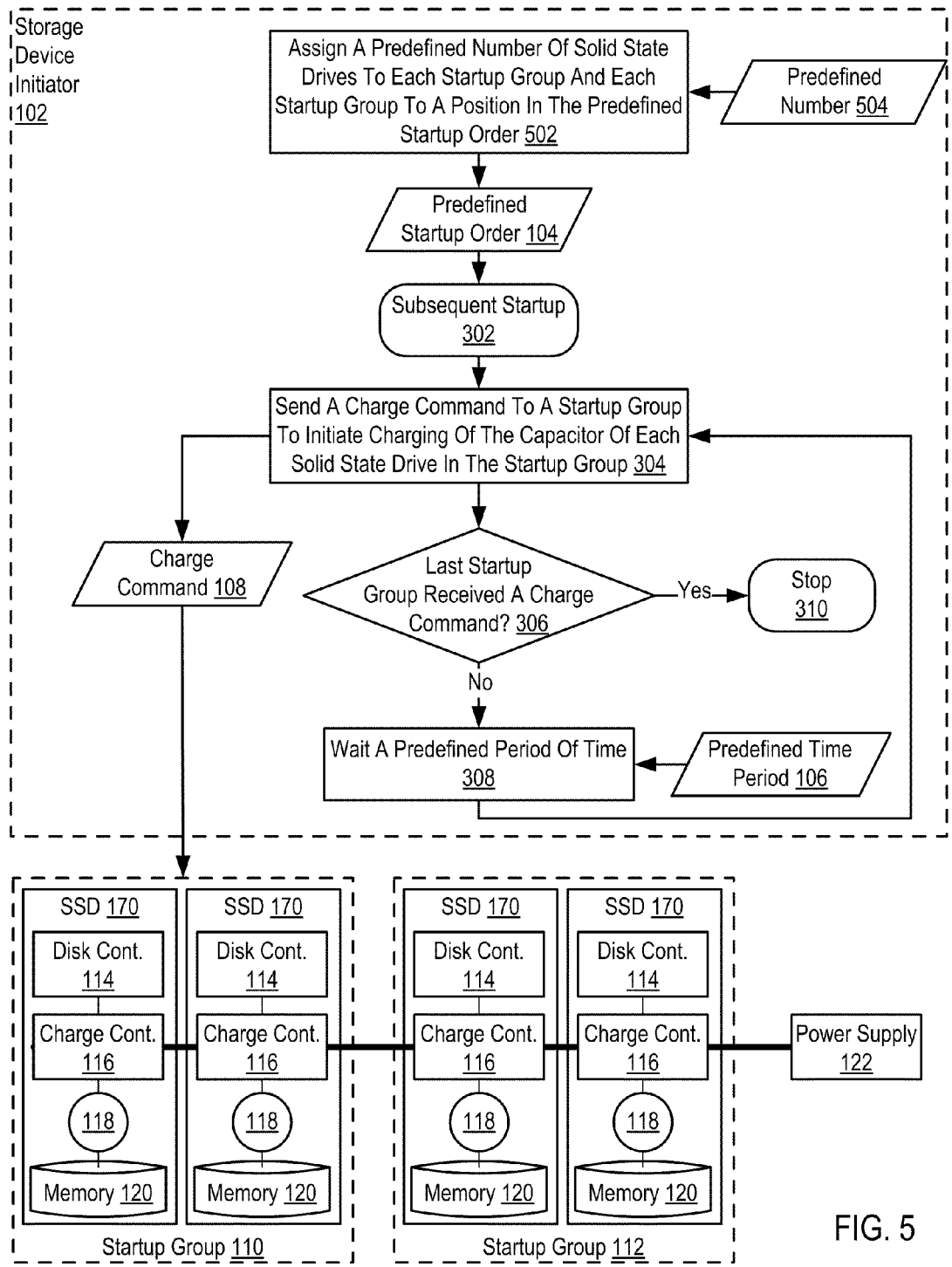
FIG. 5 sets forth a flow chart illustrating a further exemplary method for reducing current draw of a plurality of solid state drives at computer startup according to embodiments of the present invention.

The method of FIG. 4 depicts but one method of assigning SSDs to startup groups. Reducing current draw of SSDs at computer startup according to embodiments of the present invention may include many different methods of assigning such SSDs to startup groups. For further explanation, therefore, FIG. 5 sets forth a flow chart illustrating a further exemplary method for reducing current draw of a plurality of solid state drives at computer startup according to embodiments of the present invention. The method of FIG. 5 is similar to the method of FIG. 3 in that in the method of FIG. 3 each SSD (170) includes computer memory (120), a capacitor (118), a disk controller (114), and a charge controller (116). The disk controller (114) is configured, by a user or system administrator, to enable the charge controller (116) to charge the capacitor (118) upon receiving a charge command (108). The SSDs (170) are organized into a plurality of startup groups (110, 112) that are characterized by a position in a predefined startup order (104). The method of FIG. 5 is also similar to the method of FIG. 3 in that the method of FIG. 5 includes beginning with a first startup group in the predefined startup order (104) and until the last startup group in the predefined startup order (104) has received a charge command (108), upon startup of the computer (152): sending (304), by a storage device initiator (102), a charge command (108) to a startup group (110, 112) to initiate charging of the capacitor (118) of each solid state drive (170) in the startup group (110, 112); and waiting (308) a predefined period of time (106) before sending another charge command (108) to a next startup group in the predefined startup order (104).

The method of FIG. 5 differs from the method of FIG. 3, however, in that the method of FIG. 5 includes assigning (502) a predefined number (504) of SSDs (170) to each startup group (110, 112). In the method of FIG. 5, the storage device initiator (102) is configured to assign each startup group a particular number (504) of SSDs. All but one startup group in the embodiment of FIG. 5 includes an identical number of SSDs. Consider, for example, that the storage device initiator is configured to assign two SSDs to each startup group. Consider also that the computer includes seven SSDs. The storage device initiator (102) may assign (502) two SSDs to each startup group, creating three startup groups each containing two SSDs and another startup group containing one SSD. The startup groups may then be assigned to a position in the predefined startup order (104). As no priority is specified in the method of FIG. 5 for each startup group, the startup order may be defined in various ways, such as, for example by assigning each of the startup groups to a different, random position.

Figure 6:
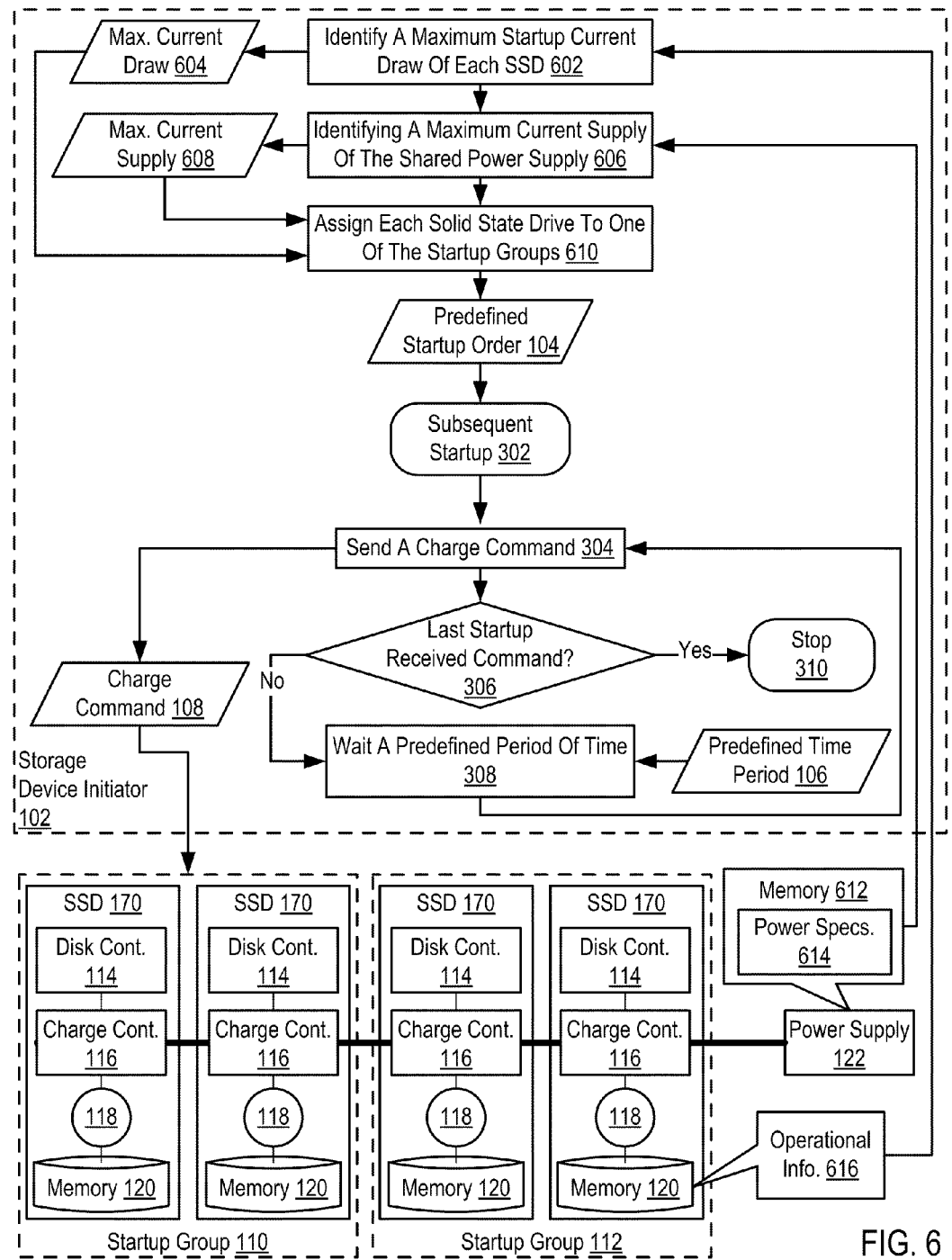
FIG. 6 sets forth a flow chart illustrating a further exemplary method for reducing current draw of a plurality of solid state drives at computer startup according to embodiments of the present invention.

In the methods of FIG. 4 and FIG. 5 above, the storage device initiator (102) may assign SSDs to startup groups and startup groups to a position in the predefined startup order in dependence upon information provided by a system administrator or other user. Other information, not provided by such a user, may also be used to define a startup group and startup order. For further explanation, therefore, for further explanation, therefore, FIG. 6 sets forth a flow chart illustrating a further exemplary method for reducing current draw of a plurality of solid state drives at computer startup according to embodiments of the present invention. The method of FIG. 6 is similar to the method of FIG. 3 in that in the method of FIG. 3 each SSD (170) includes computer memory (120), a capacitor (118), a disk controller (114), and a charge controller (116). The disk controller (114) is configured, by a user or system administrator, to enable the charge controller (116) to charge the capacitor (118) upon receiving a charge command (108). The SSDs (170) are organized into a plurality of startup groups (110, 112) that are characterized by a position in a predefined startup order (104). The method of FIG. 6 is also similar to the method of FIG. 3 in that the method of FIG. 6 includes beginning with a first startup group in the predefined startup order (104) and until the last startup group in the predefined startup order (104) has received a charge command (108), upon startup of the computer (152): sending (304), by a storage device initiator (102), a charge command (108) to a startup group (110, 112) to initiate charging of the capacitor (118) of each solid state drive (170) in the startup group (110, 112); and waiting (308) a predefined period of time (106) before sending another charge command (108) to a next startup group in the predefined startup order (104).

The method of FIG. 6 differs from the method of FIG. 5, however, in that the method of FIG. 6 includes identifying (602), from operational information (616) stored in memory (120) of each solid state drive (170), a maximum startup current draw (604) of each solid state drive (170). Operational information (616) may be implemented as vital product data ('VPD') or as another data structure. VPD collection of configuration and informational data associated with a particular set of hardware or software. VPD may store information such as part numbers, serial numbers, and engineering change levels. VPD may also contain power information such as a maximum startup current draw (604). SSD manufacturers, for example, may test an SSD product line to identify such maximum startup current draw and configure the VPD of each SSD in the product line with VPD specifying the maximum startup current draw. The storage device initiator (102) may identify (602) the maximum startup current draw of each SSD (170) by requesting the VPD, the operational information (616), from the disk controller via an out-of-band bus, or through in-band data communications.

The method of FIG. 6 also includes identifying (606), from power specifications (614) stored in memory of the shared power supply (122), a maximum current supply (608) of the shared power supply (122). Like the operational information (616) of the SSD, the power specifications (614) of the shared power supply (122) may specified in VPD stored in computer memory of the power supply. In some embodiments the storage device initiator (102) may identify the maximum current supply (608) of the shared power supply (122) from the power specifications (614), the VPD, by directly requesting the VPD from the power supply through an out-of-band bus or by requesting the VPD of the power supply from a service processor, such as a baseboard management controller ('BMC'), coupled to the power supply through an out-of-band bus.

The method of FIG. 6 also includes assigning (610) each solid state drive (170) to one of the startup groups (110, 112) in dependence upon the solid state drive's maximum startup current draw (604) and the maximum current supply (608) of the shared power supply (112). Assigning (610) each solid state drive (170) to a startup group in dependence upon the SSDs maximum startup current draw (604) and the maximum current supply (608) of the shared power supply (112) may be carried out by assigning SSDs to groups so that each group is capable of drawing no more than a predetermined threshold of current from the power supply. Such a predetermined threshold may be a variable threshold, dependent upon the maximum current supply of the power supply. Consider, for example, that the predetermined threshold is set to limit current draw of each of the startup groups to no more than 5% of the power supply's maximum current supply and the maximum current supply is 10 Amperes (A). The storage device initiator then may assign SSDs to startup groups such that no startup group is capable of drawing more than 0.5 A.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing current draw of a plurality of solid state drives from a shared power supply of a computer at computer startup, each solid state drive comprising computer memory, a capacitor, a disk controller, and a charge controller, the disk controller configured to enable the charge controller to charge the capacitor upon receiving a charge command, the plurality of solid state drives organized into a plurality of startup groups, the startup groups characterized by a position in a predefined startup order, the method comprising:
   upon startup of the computer, beginning with a first startup group in the predefined startup order and until the last startup group in the predefined startup order has received a charge command:
   sending, by a storage device initiator, a charge command to a startup group to initiate charging of the capacitor of each solid state drive in the startup group; and
   waiting a predefined period of time before sending another charge command to a next startup group in the predefined startup order.

2. The method of claim 1 further comprising assigning each solid state drive to one of the startup groups and to a position in the predefined startup order in dependence upon a predefined priority of the solid state drive.

3. The method of claim 1 further comprising assigning a predefined number of solid state drives to each startup group; and
assigning each startup group to a position in the predefined startup order.

4. The method of claim 1 further comprising:
identifying, from operational information stored in memory of each solid state drive, a maximum startup current draw of each solid state drive;
identifying, from power specifications stored in memory of the shared power supply, a maximum current supply of the shared power supply;
assigning each solid state drive to one of the startup groups in dependence upon the solid state drive's maximum startup current draw and the maximum current supply of the shared power supply.

5. The method of claim 1 wherein:
a particular startup group includes one or more solid state drives coupled for data communications to associated drive adapters and the storage device initiator via a Serial Advanced Technology Attachment ('SATA') bus and storage interface; and
sending a charge command to the particular startup group includes establishing physical layer ('PHY') communications with the drive adapters of the particular startup group.

6. The method of claim 1 wherein:
a particular startup group includes one or more solid state drives coupled for data communications to associated drive adapters and the storage device initiator over a Serial Attached Small Computer System Interface ('SAS') bus; and
sending a charge command to the particular startup group includes sending a NOTIFY (ENABLE SPINUP) and SCSI UNIT START/STOP primitive to the disk controllers of the particular startup group.

7. Apparatus for reducing current draw of a plurality of solid state drives at computer startup, each solid state drive comprising computer memory, a capacitor, a disk controller, and a charge controller, the disk controller configured to enable the charge controller to charge the capacitor upon receiving a charge command, the plurality of solid state drives organized into a plurality of startup groups, the startup groups characterized by a position in a predefined startup order, the apparatus comprising a computer processor, a computer memory operatively coupled to the computer processor, the computer memory having disposed within it computer program instructions capable of:
   upon startup of the computer, beginning with a first startup group in the predefined startup order and until the last startup group in the predefined startup order has received a charge command:
   sending, by a storage device initiator, a charge command to a startup group to initiate charging of the capacitor of each solid state drive in the startup group; and
   waiting a predefined period of time before sending another charge command to a next startup group in the predefined startup order.

8. The apparatus of claim 7 further comprising computer program instructions capable of assigning each solid state drive to one of the startup groups and to a position in the predefined startup order in dependence upon a predefined priority of the solid state drive.

9. The apparatus of claim 7 further comprising computer program instructions capable of:
assigning a predefined number of solid state drives to each startup group; and
assigning each startup group to a position in the predefined startup order.

10. The apparatus of claim 7 further comprising computer program instructions capable of:
  identifying, from operational information stored in memory of each solid state drive, a maximum startup current draw of each solid state drive;
  identifying, from power specifications stored in memory of the shared power supply, a maximum current supply of the shared power supply;
  assigning each solid state drive to one of the startup groups in dependence upon the solid state drive's maximum startup current draw and the maximum current supply of the shared power supply.

11. The apparatus of claim 7 wherein:
  a particular startup group includes one or more solid state drives coupled for data communications to associated drive adapters and the storage device initiator via a Serial Advanced Technology Attachment ('SATA') bus and storage interface; and
  sending a charge command to the particular startup group includes establishing physical layer ('PHY') communications with the drive adapters of the particular startup group.

12. The apparatus of claim 7 wherein:
  a particular startup group includes one or more solid state drives coupled for data communications to associated drive adapters and the storage device initiator over a Serial Attached Small Computer System Interface ('SAS') bus; and
  sending a charge command to the particular startup group includes sending a NOTIFY (ENABLE SPINUP) and SCSI UNIT START/STOP primitive to the disk controllers of the particular startup group.

13. A computer program product for reducing current draw of a plurality of solid state drives at computer startup, each solid state drive comprising computer memory, a capacitor, a disk controller, and a charge controller, the disk controller configured to enable the charge controller to charge the capacitor upon receiving a charge command, the plurality of solid state drives organized into a plurality of startup groups, the startup groups characterized by a position in a predefined startup order, the computer program product disposed upon a computer readable storage medium that is not a signal, the computer program product comprising computer program instructions capable, when executed, of causing a computer to carry out the steps of:
  upon startup of the computer, beginning with a first startup group in the predefined startup order and until the last startup group in the predefined startup order has received a charge command:
    sending, by a storage device initiator, a charge command to a startup group to initiate charging of the capacitor of each solid state drive in the startup group; and
    waiting a predefined period of time before sending another charge command to a next startup group in the predefined startup order.

14. The computer program product of claim 13 further comprising computer program instructions capable of assigning each solid state drive to one of the startup groups and to a position in the predefined startup order in dependence upon a predefined priority of the solid state drive.

15. The computer program product of claim 13 further comprising computer program instructions capable of:
  assigning a predefined number of solid state drives to each startup group; and
  assigning each startup group to a position in the predefined startup order.

16. The computer program product of claim 13 further comprising computer program instructions capable of:
  identifying, from operational information stored in memory of each solid state drive, a maximum startup current draw of each solid state drive;
  identifying, from power specifications stored in memory of the shared power supply, a maximum current supply of the shared power supply;
  assigning each solid state drive to one of the startup groups in dependence upon the solid state drive's maximum startup current draw and the maximum current supply of the shared power supply.

17. The computer program product of claim 13 wherein:
  a particular startup group includes one or more solid state drives coupled for data communications to associated drive adapters and the storage device initiator via a Serial Advanced Technology Attachment ('SATA') bus and storage interface; and
  sending a charge command to the particular startup group includes establishing physical layer ('PHY') communications with the drive adapters of the particular startup group.

18. The computer program product of claim 13 wherein:
  a particular startup group includes one or more solid state drives coupled for data communications to associated drive adapters and the storage device initiator over a Serial Attached Small Computer System Interface ('SAS') bus; and
  sending a charge command to the particular startup group includes sending a NOTIFY (ENABLE SPINUP) and SCSI UNIT START/STOP primitive to the disk controllers of the particular startup group.

* * * * *